United States Patent Office 2,744,893
Patented May 8, 1956

2,744,893

SEPARATION OF FLAVONOID COMPOUNDS

Simon H. Wender, Norman, Okla., Thomas B. Gage, Richmond, Va., Clark H. Ice, Aiken, S. C., and Quentin L. Morris, Commerce, Tex., assignors to the United States of America as represented by the United States Atomic Energy Commission No Drawing. Application April 29, 1952,
Serial No. 285,046

11 Claims. (Cl. 260—210)

Our invention relates to an improved method of separating flavonoid compounds and more particularly to the separation of flavonoid aglycones from flavonoid glycosides.

The flavonoid compounds comprise a very important class of plant pigments which are widely distributed in the vegetable kingdom. Interest is shown in a number of these compounds due to their vitamin-like action in increasing the resistance of blood capillaries to rupture. The term "vitamin P" is sometimes applied to flavonoids having this property. Rutin, a member of this class of pigments enjoys widespread use as a drug for blood vessel treatment. In addition, it is anticipated that flavonoids will be of use in the control of radiation injury, and considerable experimental effort is being expended in this direction.

There is, therefore, considerable demand for such types of compounds, for both practical and experimental purposes. U. S. Patent No. 2,681,907, June 22, 1954, entitled "Isolation of Flavonoid Compounds," in the name of Simon H. Wender, discloses methods for recovering quantities of flavonoids from their naturally occurring source materials or from extraneous impurities. However, these compounds even after the employment of such methods, occasionally occur in mixtures, particularly when aglycones and glycosides are involved, and the isolation of any one type of flavonoid from such a mixture, in substantially pure form and in relatively large quantity, has been exceedingly difficult to achieve. For example, commercially available rutin is usually contaminated with about 1% to about 3% quercetin.

Old methods for separating flavonoid aglycones from flavonoid glycosides usually involved making use of their slight differences in solubility in fractional recrystallizations from water-alcohol mixtures. However, tedious repetition and significant losses are inherent in these procedures.

An object of our invention, therefore, is to provide an improved method for separating flavonoid compounds.

Another object is to provide an improved method for separating flavonoid aglycones from flavonoid glycosides.

Still another object is to provide an improved process for separating quercetin from rutin.

Further objects and advantages of our invention will be apparent from the following description.

In accordance with our invention, substantially complete separation of flavonoid aglycones from flavonoid glycosides may be achieved by contacting an aqueous solution of said flavonoids with a cation-exchange resin, separating the resulting flavonoid-depleted solution from the resulting flavonoid-retaining resin, eluting the glycoside fraction of the flavonoids retained on said resin with an aqueous-organic solvent and thereafter eluting the remaining adsorbed flavonoids with an organic solvent.

Using our invention, aglycone and glycoside flavonoids may be readily separated via the ion-exchange resin, in addition to being further purified of impurities accompanying them from original source materials. No crystallization or involved additional steps are required.

The table, following, is illustrative of the flavonoid aglycones and glycosides which may be separated, one from the other, singly or in groups, utilizing methods herein described.

TABLE

*Flavonol aglycones*

Gossypetin: 3,3',4',5,7,8-hexahydroxyflavone
Kaempferol: 3,4',5,7-tetrahydroxyflavone
Morin: 2',3,4',5,7-pentahydroxyflavone
Nortangeretin: 3,4',5,6,7-pentahydroxyflavone
Patuletin: 3,3',4',5,7-pentahydroxy-6-methoxyflavone
Quercetagetin: 3,3',4',5,6,7-hexahydroxyflavone
Quercetin: 3,3',4',5,7-pentahydroxyflavone
Rhamnetin: 3,3',4',5-pentahydroxy-7-methoxyflavone
Robinetin: 3,3',4',5',7-pentahydroxyflavone

*Flavone aglycones*

Acacetin: 5,7-dihydroxy-4'-methoxyflavone
Apigenin: 4',5,7-trihydroxyflavone
Auranetin: a pentamethoxyflavone
Chrysin: 5,7-dihydroxyflavone
Genkwanin: 4',5-dihydroxy-7-methoxyflavone
Isowogonin: 5,8-dihydroxy-7-methoxyflavone
Norwogonin: 5,7,8-trihydroxyflavone
Oroxylin A: 5,7-dihydroxy-6-methoxyflavone
Wogonin: 5,7-dihydroxy-8-methoxyflavone

*Flavanone aglycones*

Butin: 3',4',7-trihydroxyflavanone
Hesperitin: 3',5,7-trihydroxy-4'-methoxyflavanone
Homoeriodictyol: 4',5,7-trihydroxy-3'-methoxyflavanone
Liquiritiginin: 4',7-dihydroxyflavanone

*Flavonol glycosides*

Gossypetin: 8-glucoside of gossypetin
Gossypitrin: 7-glucoside of gossypetin
Isoquercitrin: 3-glucoside of quercetin
Quercemeritrin: 7-glucoside of quercetin
Quercitrin: 3-rhamnoside of quercetin
Robinin: 3-robinoside of kaemferol
Rutin: 3-rutinoside of quercetin
Xanthorhamnin: 3-trirhamnoside of rhamnetin

*Flavanone glycosides*

Hesperidin: 7-rhamnoside of hesperitin
Naringin: 7-rhamnoglucoside of 4',5,7-trihydroxyflavone
Neohesperidin: A rhamnosidoglucoside of hesperitin U. S. Patent No. 2,681,907 discloses ion-exchange absorbents, adsorption-elution flow-rates, solvents for the elution of flavonoids as a class, and suitable systems for utilizing the same, which are similarly applicable to and employable in the method of our present invention. As indicated therein, numerous organic solvent eluting agents are suitable. In general, any relatively low molecular weight, aliphatic, organic solvent such as, for example, acetone, ethanol, ethyl acetate, butanol or isopropyl alcohol may be employed. However, in view of relative cheapness and efficient eluting action, ethanol is preferred. The significant distinction between the two applications resides in the use, in the instant case, of an additional intermediate selective elution step which we find may be used prior to the elution step of the co-pending application, in order first to selectively remove any flavonoid glycoside fraction present in the flavonoid values retained on the adsorbent.

Thus, we find that, in general, water-miscible organic solvents selected from the organic solvents disclosed in the U. S. Patent 2,681,907, when mixed with water in the proper proportions, may be utilized to selectively elute flavonoid glycosides from a mixture of adsorbed flavonoid compounds and especially from flavonoid aglycones. However, aqueous-ispropyl alcohol is preferred as the aqueous-organic solvent for the selective elution step herein described.

As used herein and in the appended claims, the term "aqueous-organic solvent" is intended to designate an organic solvent containing at least 50% water by volume, while the term "organic solvent" is intended to designate an organic solvent containing not more that about 10% water by volume.

Suitable mixtures of such a solvent with water range from about 10% to about 50% organic solvent by volume while a volume of approximately 20% organic solvent is preferred.

In a preferred embodiment of our invention, approximately 3 liters of an aqueous solution, containing approximately 2 grams of a mixture of flavonoid aglycones and flavonoid glycosides, is percolated through a 5 centimeter diameter column containing approximately 1.6 liters of a wet-settled, comminuted cation-exchange resin (approximately 60 mesh to 100 mesh), characterized by a plurality of active carboxylic groups, at a rate approximately 4 liters/hour. The glycoside portion of the resulting adsorbed flavonoids may then be eluted from the resin by percolating about 3 liters of a 20% isopropyl alcohol-80% water mixture through the column at a rate of about 4 liters/hour. The remaining adsorbed flavonoids may then be eluted from the resin by percolating about 2 liters of ethanol through the column in about ½ hour.

The following specific example illustrates our invention in greater detail.

EXAMPLE

A Pyrex column 5 centimeters x 120 centimeters, was packed with a 5 centimeter layer of glass wool, followed by 5 centimeters of purified sea sand, and then filled to a height of 92 centimeters with a slurry of a cation-exchange resin (Amberlite IRC–50 manufactured by Rohm & Haas Co., Philadelphia, Pa.). For preparation of the hydrogen form of the resin the column was downwashed with 4 liters of 2% HCl, backwashed with distilled water, and finally downwashed with distilled water until the washings were neutral.

Two grams of rutin containing approximately 1% quercetin impurity were dissolved in 3 liters of boiling water, and the resulting solution was quickly cooled to room temperature. The solution was passed through the ion exchange column and followed by 1 liter of distilled water. A light-yellow band of color extended ⅓ of the distance down the column. The water wash was allowed to drain from the column until level with the top of the resin bed. Three liters of 20% isopropyl alcohol-80% water was then passed through the column at a flow rate of 60 milliliters/minute-70 milliliters/minute. The isopropyl alcohol-water solution slowly moved the yellow band of color down the column. The alcohol solution was followed through the column by distilled water in order to flush the last of the alcohol through the resin bed. The alcohol-water eluate was concentrated at reduced pressure to 600 ml., and the concentrate was refrigerated overnight to allow precipitation to occur. The precipitate was collected and dried at 110° C. One and eight-tenths grams of rutin were recovered from the column.

Paper partition chromatography of the recovered rutin revealed no fluorescent zone of quercetin in contrast to the easily detectable zone of quercetin in paper chromatograms of the original sample. The quercetin was subsequently recovered from the column by elution with 95% ethyl alcohol. Paper partition chromatography of the concentrated ethyl alcohol fraction revealed an insignificant amount of rutin present along with the quercetin.

In general, it may be said that the above example is merely illustrative and should not be construed as limiting the scope of our invention, which should be understood to be limited only as indicated by the appended claims.

We claim:

1. An improved method of separating a mixture of flavonoid aglycones from flavonoid glycosides, which comprises contacting an aqueous solution of said flavonoids with a comminuted cation-exchange resin, separating the resulting flavonoid-depleted solution from the resulting flavonoid-retaining resin, selectively eluting the adsorbed flavonoid glycosides from said resin with an aqueous-organic solvent containing at least approximately 50% water, by volume, and eluting the remaining flavonoid aglycones from the resulting resin with an organic solvent containing not more than approximately 10% water, by volume.

2. The method of claim 1 in which the aqueous-organic solvent is an aqueous solution of isopropyl alcohol.

3. The method of claim 2 in which the isopropyl alcohol constitutes approximately 10% to approximately 50% of the solution by volume.

4. The method of claim 3 in which the isopropyl alcohol constitutes approximately 20% of the solution by volume.

5. The method of claim 1 in which the organic solvent is ethanol.

6. The method of claim 1 in which the resin is a weak acid cation-exchange resin characterized by a plurality of active carboxylic groups.

7. An improved method of separating a flavonoid aglycone from a flavonoid glycoside which comprises passing an aqueous solution of said flavonoids through a comminuted cation-exchange resin bed, eluting the resulting adsorbed flavonoid glycoside with an aqueous-organic solvent containing at least approximately 50% water, by volume, and eluting the remaining adsorbed flavonoid aglycone with an organic solvent containing not more than approximately 10% water, by volume.

8. The method of claim 7 in which the adsorption and elution flow rates are from approximately 10 liters/hour/square decimeter of bed area to approximately 30 liters/hour/square decimeter of bed area.

9. The method of claim 8 in which the adsorption and elution flow rates are approximately 20 liters/hour/square decimeter.

10. An improved method of separating quercetin from rutin, which comprises contacting an aqueous solution of said flavonoids with a comminuted cation exchange resin, selectively eluting the adsorbed rutin from said resin with an aqueous-organic solvent containing at least approximately 50% water, by volume, and then eluting the remaining, adsorbed quercetin from said resin with an organic solvent containing not more than approximately 10% water, by volume.

11. An improved method of separating quercetin from rutin, which comprises passing an aqueous solution of said flavonoids through a comminuted bed of a weak acid cation exchange resin characterized by a plurality of active carboxylic groups, eluting the adsorbed rutin from said resin with aqueous isopropyl alcohol containing at least approximately 50% water, by volume, and eluting the remaining, adsorbed quercetin from said resin with ethanol containing not more than approximately 10% water, by volume.

References Cited in the file of this patent

UNITED STATES PATENTS

| 2,520,127 | Couch et al. | Aug. 29, 1952 |
| 2,681,907 | Wender | June 22, 1954 |

OTHER REFERENCES

Nachod: Ion Exchange, pages 339–340, Academic Press (1949).

Gage et al.: Science, 113, 522 (1951).